United States Patent
Choi et al.

(10) Patent No.: US 9,434,098 B2
(45) Date of Patent: Sep. 6, 2016

(54) SLOT DIE FOR FILM MANUFACTURING

(71) Applicant: SAMSUNG ELECTRONICS CO., LTD., Suwon-si (KR)

(72) Inventors: Sung Won Choi, Hwaseong-si (KR); Jae Wook Nam, Seoul (KR); Byung Hee Sohn, Yongin-si (KR); Sun Jin Song, Seoul (KR); Chan Jae Ahn, Seoul (KR); Semi Lee, Suwon-si (KR); Sung Woo Hong, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 2 days.

(21) Appl. No.: 14/571,475

(22) Filed: Dec. 16, 2014

(65) Prior Publication Data
US 2015/0343689 A1 Dec. 3, 2015

(30) Foreign Application Priority Data
May 29, 2014 (KR) .................. 10-2014-0065326

(51) Int. Cl.
*B29C 47/14* (2006.01)
*B29C 47/92* (2006.01)
(Continued)

(52) U.S. Cl.
CPC ............... *B29C 47/14* (2013.01); *B29C 47/92* (2013.01); *B29C 47/0021* (2013.01); *B29C 2947/926* (2013.01); *B29C 2947/92904* (2013.01); *B29L 2007/008* (2013.01)

(58) Field of Classification Search
CPC . B29C 47/14; B29C 47/29; B29C 2947/926; B29C 2947/92904
See application file for complete search history.

(56) References Cited

U.S. PATENT DOCUMENTS 3,557,265 A * 1/1971 Chisholm ............... B29C 44/22
264/173.16
4,880,370 A * 11/1989 Krumm ................. B29C 47/145
156/244.11
(Continued)

FOREIGN PATENT DOCUMENTS

CN 203004272 6/2013
EP 0607135 7/1997
(Continued)

OTHER PUBLICATIONS

C.W. MacMinn et al., "Tubeless Siphon and Die Swell Demonstration", http://web.mit.edu/nnf/research/phenomena/demos.html, Sep. 26, 2004, pp. 1-6.
Luca Brandt et al., "Delayed die swell", http://www.mech.kth.se/~luca/html_lib/dieswell.html, Dec. 5, 2014.

*Primary Examiner* — Yogendra Gupta
*Assistant Examiner* — Joseph Leyson
(74) *Attorney, Agent, or Firm* — Cantor Colburn LLP

(57) ABSTRACT

A slot die includes a material distribution chamber configured to distribute a casting solution supplied to the material distribution chamber, and a lip in which a slot including an expansion portion is defined and through which the casting solution distributed in the material distribution chamber is discharged, where a width of the expansion portion taken in a first direction is expanded from one side of the expansion portion to a lip end facing the one side and the one side of the expansion portion is apart from the lip end by a predetermined length taken along a second direction which is perpendicular to the first direction and substantially parallel to a flow direction of the casting solution.

7 Claims, 4 Drawing Sheets

(51) Int. Cl.
*B29L 7/00* (2006.01)
*B29C 47/00* (2006.01)

(56) References Cited

U.S. PATENT DOCUMENTS

| | | |
|---|---|---|
| 5,256,357 A | 10/1993 | Hayward |
| 5,284,430 A * | 2/1994 | Tomic ................ B28B 3/2672 |
| | | 425/133.5 |
| 5,389,324 A * | 2/1995 | Lewis ................ B29C 47/0021 |
| | | 264/1.6 |

FOREIGN PATENT DOCUMENTS

| | | |
|---|---|---|
| JP | 05-050004 | 3/1993 |
| JP | 06-031789 | 2/1994 |
| JP | 06-134731 | 5/1994 |
| JP | 07-314693 | 12/1995 |
| KR | 1992-0006092 | 4/1992 |
| KR | 1994-7002971 | 9/1994 |
| KR | 10-2009-0073136 | 7/2009 |

* cited by examiner

SLOT DIE FOR FILM MANUFACTURING

CROSS-REFERENCE TO RELATED APPLICATION

This application claims priority to Korean Patent Application No. 10-2014-0065326 filed on May 29, 2014, and all the benefits accruing therefrom under 35 U.S.C. §119, the entire contents of which are incorporated herein by reference.

BACKGROUND (a) Field

The disclosure relates to a slot die for manufacturing a film.

(b) Description of the Related Art

Various films such as a substrate film, a window film, a retardation film, and the like are used in a flat display device such as a liquid crystal display, for example, but not limited thereto. In order to manufacture such films, a melt extrusion method or a solution casting method is generally used. The melt extrusion method is a method for manufacturing a film by melting a polymer and then extruding the polymer using an extruder, and the melt extrusion method has features of high productivity and low cost. The solution casting method is a method in which a flexible membrane is provided on a supporter by flowing a polymer solution including a polymer and a solvent onto the supporter. Next, when the flexible membrane is removable, the flexible membrane is separated from the supporter and is then used as a wet film. A film is finally produced by evaporating the solvent from the wet film.

SUMMARY

In a solution casting method, a flexible membrane is provided by discharging a polymer solution on a supporter using a slot die, and uniformity of the flexible membrane may be deteriorated due to an influence such as an external vibration and the like.

An embodiment has been made in an effort to provide a slot die that can improve uniformity in casting a film.

A slot die according to an exemplary embodiment includes a material distribution chamber configured to distribute a casting solution supplied to the material distribution chamber and a lip in which a slot including an expansion portion is defined and through which the casting solution distributed in the material distribution chamber is discharged, where a width of the expansion portion taken along a first direction is expanded from one side of the expansion portion to a lip end facing the one side, and the one side of the expansion portion is apart from the lip end by a predetermined length taken along a second direction which is perpendicular to the first direction and substantially parallel to a flow direction of the casting solution.

In an exemplary embodiment, the width of the expansion portion may be gradually decreased to the predetermined length from the lip end.

In an exemplary embodiment, the expansion portion may include width-directional wall surfaces of the lip, where the width-directional wall surfaces define the slot, and at least one of the width-directional wall surfaces of the inclined portion is inclined with a predetermined inclination angle with respect to the second direction. Both of the width-directional wall surfaces of the lip defining the slot may be inclined with a predetermined inclination angle at the expansion portion with respect to the second direction. The predetermined inclination angle may be greater than about 0 degree and equal to or smaller than about 10 degrees. The predetermined length may be about 1 millimeter (mm) to about 3 mm.

In an exemplary embodiment, only one of the width-directional wall surfaces of the lip defining the slot is inclined with a predetermined inclination angle with respect to a discharging direction of the casting solution at the expansion portion. In the exemplary embodiment, the predetermined inclination angle may be greater than about 0 degree and equal to or smaller than about 10 degrees.

In an exemplary embodiment, the slot die may further include a device controller controlling an amount of the casting solution discharged through the lip.

According to exemplary embodiments, uniformity in casting a film can be improved by changing the shape of the lip in the slot die.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
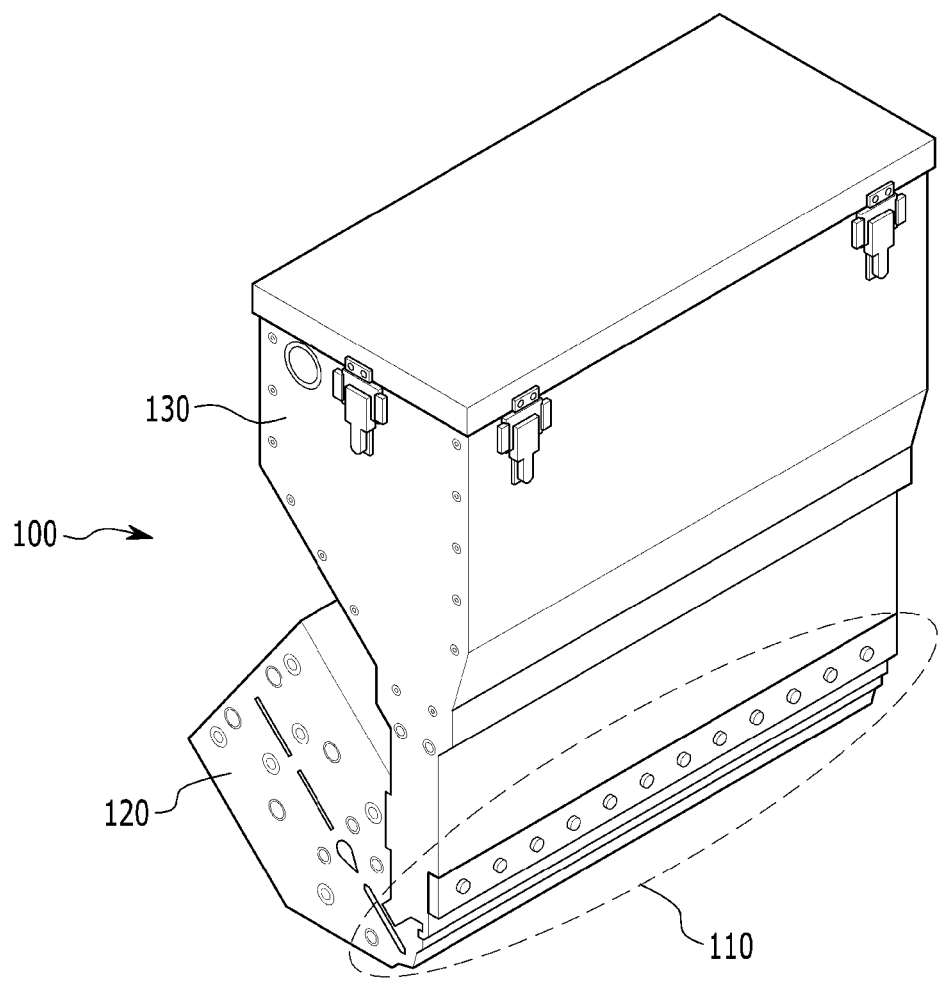
FIG. 1 is a perspective view of an exemplary embodiment of a slot die according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

It will be understood that when an element or layer is referred to a s being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example In an exemplary embodiment, if when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

First, a slot die according to an exemplary embodiment of the invention will be described with reference to FIGS. 1 and 2.

Figure 2:
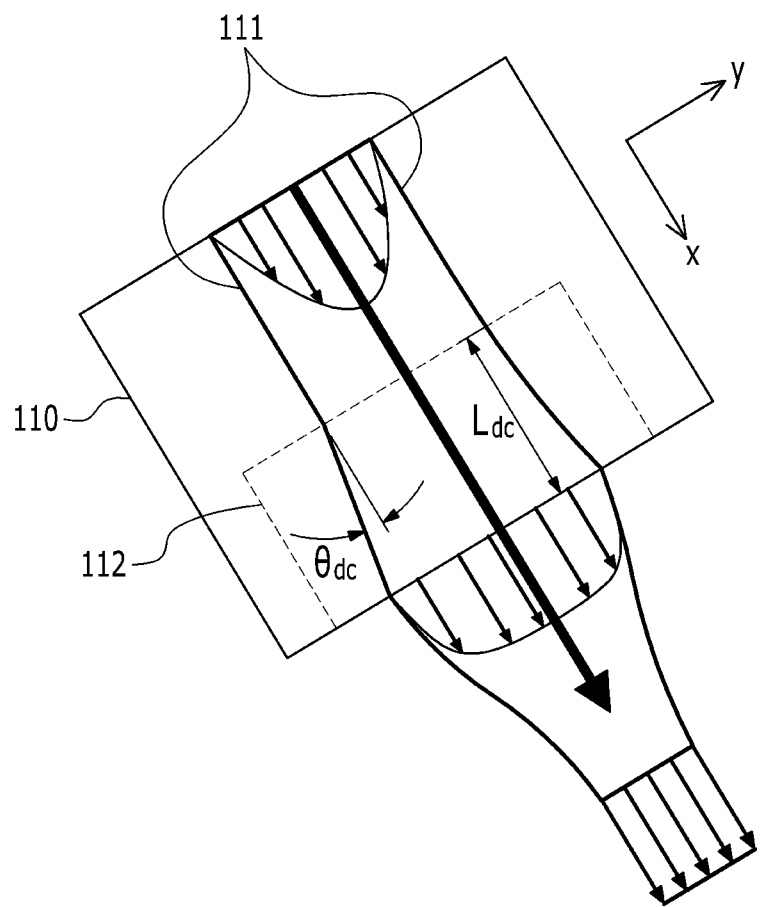
FIG. 2 is a cross-sectional view of a lip of the slot die of FIG. 1.

FIG. 1 is a perspective view of a slot die according to an exemplary embodiment of the invention, and FIG. 2 is a cross-sectional view of a lip of the slot die of FIG. 1.

A slot die 100 according to the exemplary embodiment of the invention includes a material distribution chamber 120 and a device controller 130. The material distribution chamber 120 includes a lip 110 provided at one end thereof to discharge a casting solution. The material distribution chamber 120 distributes the supplied casting solution to the lip 110, and the device controller 130 controls a function of the slot die 110, for example, controls the amount of discharge of the casting solution through the lip 110. A slot 111 discharging the casting solution is defined in the lip 110. In an exemplary embodiment, the slot 111 is a long band-shaped hole, and a flexible membrane is provided on a supporter by discharging the casting solution in a form of a thin film.

As shown in FIG. 2, the slot 111 includes an expansion portion 112 near a slot end and a width of the expansion portion 112 taken in the y-direction that is substantially perpendicular to the x-direction is gradually increased from the slot end. In the illustrated exemplary embodiment, a flow direction of the casting solution is substantially parallel to the x-direction. The expansion portion 112 reaches the slot end by being expanded while having a predetermined inclination angle $\theta_{dc}$ with respect to another portion having a constant width. In an exemplary embodiment, the predetermined inclination angle $\theta_{dc}$ may have a range between about 0 degree and about 10 degrees with respect to the x-axis, and preferably has an angle of less than about 5 degrees for controlling the thickness of the casting solution. When the inclination angle $\theta_{dc}$ is greater than about 10 degrees, the thickness of the casting solution may not be simply controlled. In an exemplary embodiment, a length $L_{dc}$ of the expansion portion 112 taken along the x-axis may be ranged between about 1 millimeter (mm) and about 3 mm.

Figure 3:
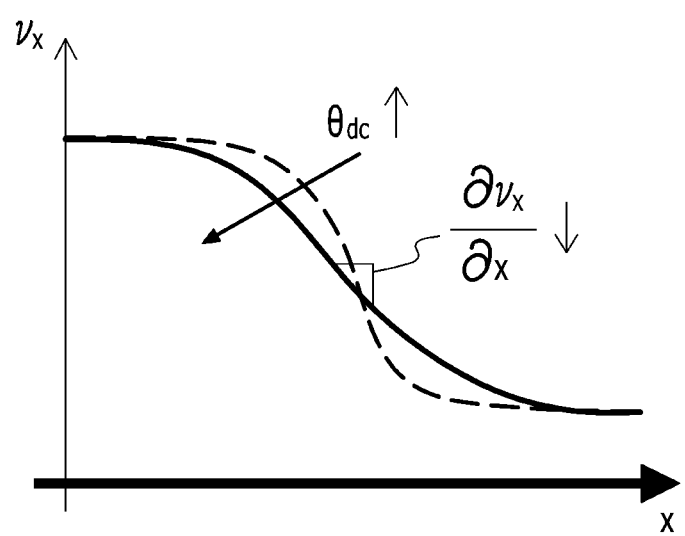
FIG. 3 is a graph illustrating an exemplary embodiment of flow velocity variation at the peripheral area of the slot die versus a distance according to the invention.

FIG. 3 is a graph illustrating a flow velocity variation of the solution at the peripheral area of the lip of the slot die.

Referring to FIGS. 2 and 3, when the expansion portion 112 is provided near the lip end of the slot 111, the flow velocity variation of the casting solution is reduced near the lip end. That is, when the expansion portion 112 is not provided, as shown by the dotted line in FIG. 3, the flow velocity $v_x$ of the casting solution is rapidly changed at the lip end. However, when the expansion portion 112 is provided, as shown by the solid line of FIG. 3, the flow velocity $v_x$ becomes smooth. That is, the derivative of the flow velocity with respect to the distance along the x axis, i.e., $\partial v_x/\partial x$, becomes smaller as the predetermined inclination angle $\theta_{dc}$ becomes greater. As described, when the flow velocity variation becomes smooth at the lip end, a vertical stress due to the flow velocity variation is decreased, and accordingly, swelling of a die in the y-direction that is substantially perpendicular to the flow direction of the casting solution at the outside of the lip end is reduced. When external vibration is applied while the die is swelling, an interface between a gas and a liquid is periodically deformed, thereby causing a thickness variation of a film provided therein. However, when the die swelling is reduced by providing the expansion portion 112 as in the exemplary embodiment of the invention, the variation in the interface of the gas and the liquid is decreased even through the external vibration is applied, and accordingly the thickness variation of the film provided therein is also decreased. Thus, the thickness uniformity of the film is improved.

Figure 4:
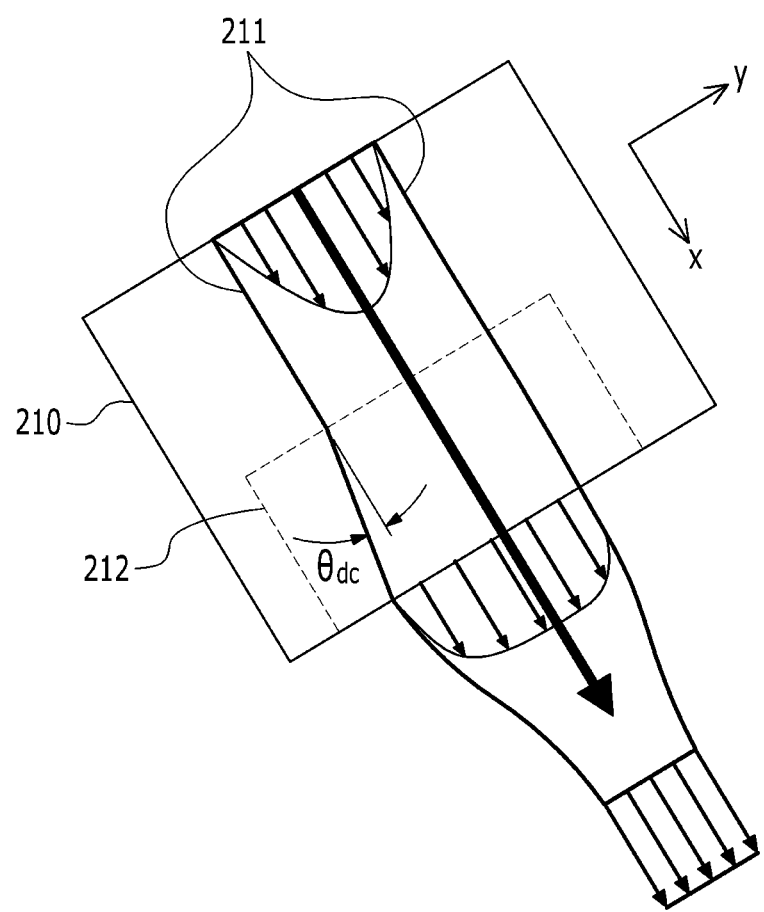
FIG. 4 is a cross-sectional view of another exemplary embodiment of a lip of a slot die according to the invention.

FIG. 4 is a cross-sectional view of a lip of a slot die according to another exemplary embodiment of the invention.

The slot die according to other exemplary embodiment of the invention is different from the slot die of FIGS. 1 and 2 in terms of the shape of an expansion portion 212 of a slot 211 of a lip 210. In the expansion portion 212 of the exemplary embodiment, one of lateral wall surfaces that define the slot 211 reaches a lip end and is expanded with a predetermined inclination angle $\theta_{dc}$ with respect to the x-axis, and the other wall surface is not expanded. In an exemplary embodiment, the predetermined inclination angle $\theta_{dc}$ may have a range between about 0 degree and about 10 degrees, and preferably has an inclination angle of degree 5 degrees for controlling the thickness of a casting solution. When the inclination angle $\theta_{dc}$ is greater than about 10 degrees, the thickness of the casting solution may not be easily controlled. A length $L_{dc}$ of the expansion portion 112 taken along the x-axis may be ranged between about 1 mm and about 3 mm.

In case of the slot die according to the exemplary embodiment of FIG. 4, the flow velocity of the casting solution is reduced near the lip end so that the thickness uniformity of a film provided therein can be improved.

As described, the lateral wall surfaces of the expansion portion 212, defining the slot 211 of the lip 210 may be set to be inclined with a predetermined angle or only one of the lateral wall surfaces may be inclined with a predetermined angle. In addition, inclination angles of the lateral wall surfaces that define the slot 211 may be set to be different from each other.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A slot die comprising:
a material distribution chamber configured to distribute a casting solution supplied to the material distribution chamber; and
a lip in which a slot including an expansion portion is defined and through which the casting solution distributed in the material distribution chamber is discharged, wherein a width of the expansion portion taken along a first direction is expanded from one side of the expansion portion to a lip end facing the one side, and the one side of the expansion portion is apart from the lip end by a predetermined length taken along a second direction which is perpendicular to the first direction and substantially parallel to a flow direction of the casting solution, wherein the expansion portion of the lip includes width-directional wall surfaces, where the width-directional wall surfaces define the slot, and at least one of the width-directional wall surfaces is inclined with a predetermined inclination angle with respect to the second direction, and the predetermined inclination angle is greater than about 0 degree and equal to or smaller than about 10 degrees.

2. The slot die of claim 1, wherein the width of the expansion portion is gradually decreased corresponding to the predetermined length from the lip end to the one side of the expansion portion.

3. The slot die of claim 1, wherein both of the width-directional wall surfaces of the expansion portion of the lip defining the slot are inclined with a predetermined inclination angle with respect to the second direction.

4. The slot die of claim 3, wherein the predetermined length is about 1 millimeter to about 3 millimeters.

5. The slot die of claim 1, wherein only one of the width-directional wall surfaces of the lip defining the slot is inclined with a predetermined inclination angle with respect to the second direction at the expansion portion.

6. The slot die of claim 5, wherein the predetermined length is about 1 millimeter to about 3 millimeters.

7. The slot die of claim 1, further comprising a device controller configured to control an amount of the casting solution discharged through the lip.

* * * * *